United States Patent [19]
Nelson et al.

[11] 3,881,355
[45] May 6, 1975

[54] ARCHIVE-CUP INSERT FOR LIQUID-METAL SAMPLING

[75] Inventors: Paul A. Nelson, Wheaton; Verne M. Kolba, Plainfield; Erwin C. Filewicz, Calumet City; John T. Holmes, Downers Grove, all of Ill.

[73] Assignee: The United States of America as represented by the United States Energy Research and Development Administration, Washington, D.C.

[22] Filed: Oct. 30, 1973

[21] Appl. No.: 411,127

[52] U.S. Cl............................ 73/422 R; 73 DIG./9
[51] Int. Cl. ............................................. G01n 1/14
[58] Field of Search........ 73/422 R, 422 TC, 421 B, 73/61 LM, 61 R

[56] References Cited
UNITED STATES PATENTS 2,540,944  2/1951  Handforth......................... 73/422 R
3,624,707  11/1971  Petrek............................. 73/61.1 M Primary Examiner—S. Clement Swisher
Attorney, Agent, or Firm—John A. Horan; Arthur A. Churm; Hugh H. Glenn

[57] ABSTRACT

An insert for collecting liquid-metal samples within a vertical casing includes an elongated housing with an upper and a lower overflow seal of annular shape. The lower seal includes a centrally located pedestal on which a sample cup is disposed. Liquid metal enters the annulus of the upper seal and overflows into the cup which fills and overflows into the lower seal. Liquid-metal overflow from the lower seal is discharged from the insert. On cooling, the liquid metal trapped within the seals solidifies to hermetically isolate the metal sample within the cup.

6 Claims, 2 Drawing Figures

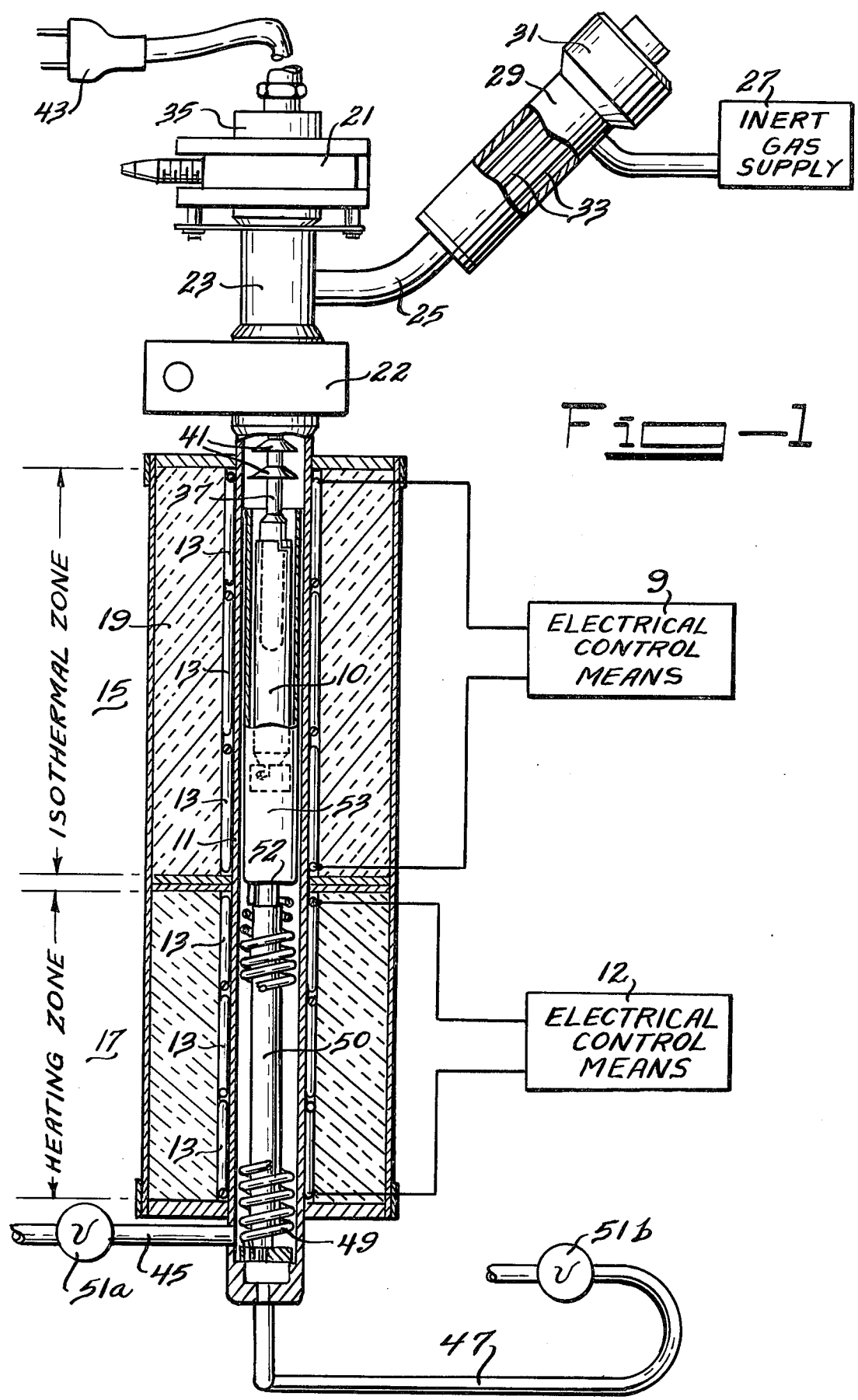

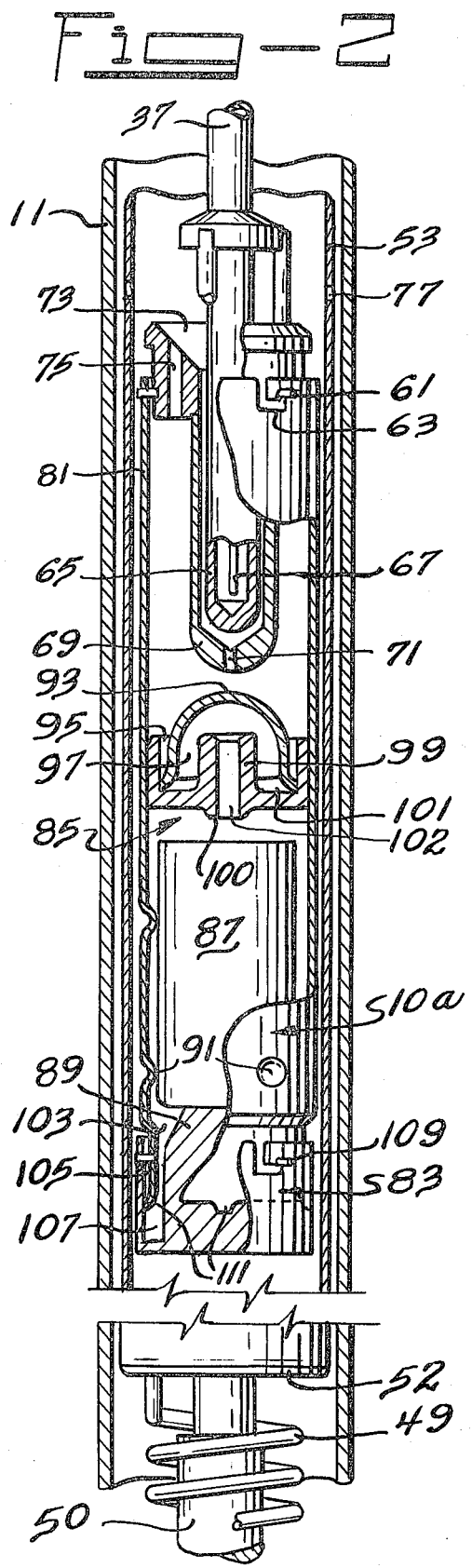

ARCHIVE-CUP INSERT FOR LIQUID-METAL SAMPLING

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to an insert for capturing and sealing a sample of liquid metal. It is particularly applicable for use with sampling systems on liquid-metal-cooled reactors. One such system is described in the assignee's copending patent application Ser. No. 411,129, entitled "Multipurpose Sampler Device for Liquid Metal," filed on the filing date of the instant application.

In operating a liquid-metal system such as a nuclear reactor, it is necessary to collect samples of the coolant for anaylsis of contained impurities. Impurities such as oxygen, hydrogen, and carbon can greatly increase the corrosive capability of a liquid-metal coolant such as sodium. For accurate analyses, it is desirable to first flush the sampler device to remove foreign substances that may have remained from previous sampling operations.

After retrieving the sample from what in the case of a reactor would be a shielded facility, the samples are either immediately analyzed or stored for a period of time within an archive. In some cases, the archive samples may only be analyzed should an abnormal deviation in the reactor operation occur. In order to provide accurate data after the samples have been stored for extended periods of time, it is necessary that they be maintained in an oxygen and moisture-free environment. Even a brief exposure of the sample to the atmosphere could significantly alter the results, as liquid metals such as lithium, sodium and potassium are easily oxidized.

SUMMARY OF THE INVENTION

Therefore, it is an object of the present invention to provide an insert for a liquid-metal sampling system in which a sealed sample of liquid metal can be captured.

It is also an object to provide an insert for capturing a sample of liquid metal in which a portion of the liquid metal seals a separable sample of liquid metal from atmospheric contact.

It is a further object to provide a sampler insert that is interchangeable with other inserts for examining liquid metal within a liquidmetal sampling system.

It is also an object to provide a sampler insert for storing an archive sample of liquid metal over an extended period of time.

In accordance with the present invention, a sampler insert is provided for obtaining hermetically sealed samples from within a vertical casing. The insert includes an elongated tube having attachment means for suspending it within the casing. A sample cup is supported within the lower portion of the tube and is spaced from the internal tube walls to define an annular passageway for sample liquid overflow. Two overflow seals are located one above and one below the sample cup for hermetically isolating the sample within the insert. Each overflow seal includes an annular reservoir that is divided by a circular separator into an inner annulus and an outer annulus interconnected by subsurface passageways. Liquid metal enters one annulus and overflows from the other leaving trapped sample liquid which solidifies on cooling to form an air-tight seal.

DESCRIPTION OF THE DRAWINGS

The present invention is illustrated in the accompanying drawings wherein:

FIG. 1 is an elevation view in cross section of a multipurpose sampler system with an archive-cup insert.

FIG. 2 is a more detailed view partly in section of the archivecup insert illustrated in FIG. 1.

DETAILED DESCRIPTION OF THE PREFERRED EMBODIMENT

Referring now to FIG. 1, a multipurpose sampler device is shown including the archive-cup insert 10 of the present invention. The multipurpose sampler device is described in the assignee's copending patent application cited above. The sampler device includes an elongated pressure casing 11 surrounded by electrical heater elements 13 and thermal insulation 19. The heating elements are separately controlled by electrical means 9 and 12 so as to establish an isothermal zone 15 which contains the sampler insert 10 and a heating zone 17 subjacent the isothermal zone.

Within the upper end of the casing beyond the heater elements 13 are two removable, clamp-type closures 21 and 22. The closures are commercially available pipe connectors that can be remotely or manually operated as required. The spool piece 23 between the two closures is adapted to receive an inert gas line 25 leading to an inert gas supply 27 for equalizing the pressure within the casing during changes in sample flow. The gas supply 27 is protected from an overflow of liquid metal by a freeze vent 29. Vent 29 comprises cooling fins 33 on the outer surface of gas line 25 and a blower 31 for passing cool air over the fins.

The upper end of closure 21 is formed as a hub 35 for closing casing 11 and for supporting an elongated suspension member 37. Suspension member 37 extends downwardly into the isothermal zone 15 where it suitably supports the sampler insert 10. The upper portion of suspension member 37 includes circular heat shields 41 for maintaining the closures and inert gas connections at an acceptably low temperature and to condense liquid-metal vapors which would otherwise deposit within the freeze vent. Member 37 is of tubular construction to also serve as a conduit communicating with a thermowell for a temperature-measuring device disposed within its lower portion near or within insert 10. A connector 43 is illustrated at the upper end of the suspension member for electrically connecting the temperaturemeasuring device to a monitoring system (not shown).

The flow of liquid metal enters and leaves the multipurpose sampler through inlet tube 45 and outlet tube 47 connected into the lower portion of casing 11. The flow is controlled by valves 51a and 51b within these tubes. Outlet tube 47 is in flow communication with a helical coil of tubing 49 formed around a column 50 within the heating zone 17. Helical coil 49 is formed with a gradual pitch preferably of less than two tube diameters in elevation per turn. Column 50 extends to the interface between the heating and isothermal zones where it supports a shroud tube 53 that extends upwardly into the isothermal zone coaxially around the sampler insert 10 but within casing 11. The bottom end of shroud tube 53 is closed with an end closure 52 which rests on column 50. End closure 52 is penetrated by the upper end of helical coil 49 for discharging liquid-metal flow from the sampler insert 10.

Referring now to FIG. 2, where a more detailed description of the archive-cup insert and the surrounding portions of the multipurpose sampler are presented. The lower portion of suspension member 37 includes a closed thermowell 65 for protecting a temperature-measuring device illustrated as thermocouple 67. Thermowell 65 is coaxially enclosed within a sheath or immersion well 69 having an orifice 71 at its lowest point. Immersion well 69 is surmounted with a flared bushing or funnel 73 which is attached to suspension member 37. Peripheral passageways 75 are formed vertically through the upper portions of funnel 73 to pass a major portion of the entering liquid-metal flow. The remaining minor portion of flow passes downwardly through immersion well 69 as it contacts thermowell 65 before being discharged through orifice 71 into the sampler insert. In order to direct liquid-metal flow into funnel 73, appropriate sized orifices 77 are located just above the funnel mouth within the upper portion of the shroud tube 53. The orifices are of sufficiently small size, for example, about one-eighth inch, such that a low head, e.g. less than 2 inches of liquid metal, will cause the flow to jet inwardly away from shroud tube 53 and into funnel 73.

Around the outer periphery of funnel 73 are horizontally projecting pins 61 which engage L-shaped slots 63 within the upper portion of the insert. The pins and slots form a bayonet-type connection for removably suspending the insert within the isothermal zone of the multipurpose sampler device. With this arrangement, thermowell 65 and immersion well 69 extend into the upper portion of the insert for temperature measurements near the sampling operation.

The archive-cup insert 10a comprises an outer tube 81 which includes slots 63 within its upper margins. The lower end of tube 81 is closed by an annular seal 83 that is removably attached by a bayonet or other suitable type of connection to permit insertion and removal of the sample cup. A second annular seal 85 is tightly positioned in a sealing relationship within the upper or central portion of tube 81 below the depth reached by immersion well 69. In between seals 83 and 85 is a space for a sample cup 87 which rests on a raised pedestal 89 at the center of annular seal 83. Cup 87 is centrally positioned by hemispherical indentations 91 within the periphery of outer tube 81.

Upper annular seal 85 includes an annular reservoir that is divided into an outer annulus 95 and an inner annulus 97 by the circumferential margins of a rounded dome 93. Circumferential passageways 101 at the edges of these margins permit subsurface flow of liquid metal between the inner and outer annuli. Within the center of annular seal 85 is a raised portion 99 including a vertical central opening 102 coaxially aligned with the opening into sample cup 87. A circular lip 100 at the bottom surface of seal 85 around the outlet provides a straight and coherent discharge flow into the insert for good agitation of the sample liquid. Raised portion 99 extends upwardly into dome 93 to an elevation slightly above the outer boundaries of annulus 95. This ensures that the seal is completely filled prior to overflow.

Lower annular seal 83 is of slightly different construction from that of seal 85. Seal 83 comprises an annular reservoir around pedestal 89 and can be made to overlap the lower extremity of tube 81. This arrangement as shown forms an inner annulus 103 and an outer annulus 105 interconnected by passageways 107 beneath tube 81. As shown, the lower seal 83 is suspended by a bayonet-type connection 109 and is spaced from the outer walls of tube 81 by arcuate tabs 111.

In operating the multipurpose sampler device assembled with an archive-cup insert, the system is first evacuated through the inert gas line 25. Subsequently, the sampler device is pressurized with inert gas, for instance nitrogen, to a pressure of a little less than that of the liquid-metal system to be sampled. After preheating the sampler device, liquid metal is valved into the heating zone of the casing where it is heated to a slightly higher temperature to ensure effective wetting of the annular seal surfaces and a hermetic closure on solidification. The sample liquid then flows upwardly through the annulus between the shroud tube and casing across well 69 and leaks out orifice 71. Orifice 71 is adequately sized to provide sufficient flow for temperature measurements while maintaining thermowell 65 immersed in liquid metal. It has been found that an orifice of about one-sixteenth inch diameter will sufficiently restrict flow at the rates given below to accomplish these requirements.

The recombined flow then passes through the outer annulus of upper seal 85 through passageways 101 beneath dome 93 and into the inner annulus 97 of the upper seal. The flow then overflows through the central opening 102 in raised portion 99 into the sample cup 87 which subsequently overflows into the lower seal 83. The flow through the lower seal passes downwardly through the inner annulus 103 of the reservoir and into the outer annulus 105 through passageways 111. The overflow from the outer annulus accumulates a sufficient level in the bottom of shroud tube 53 to overcome the pressure drop through helical coil 49.

At this point, the particular suitability of helical coil 49 is noted. Since it is of a continuous downward slope without reversals in vertical direction, inert gas trapped within the coil either at the beginning or subsequently during the operation of the sampler can be swept out by the flow of liquid metal. The flow passes downwardly into discharge tubing 47 which is of sufficiently large diameter to pass any entrained gas. Furthermore, the temperature of the liquid metal discharged through coil 49 is sufficiently lowered to avoid significant thermal stresses within the liquid-metal system on its return.

After passing sufficient flow to obtain a representative sample, valves 51a and 51b in the inlet and outlet tubes are closed. The multipurpose sampler is left undisturbed for a sufficient period of time for the liquid metal within the upper seal 85 and the lower seal 83 of the archive-cup insert to solidify. Closure 21 is then disassembled and the archive-cup insert withdrawn by means of suspension member 37. Of course, these handling operations are performed with remote operators in conjunction with a liquid-metal cooled reactor or other radioactive facility.

One problem which arose in the testing of the archive-cup insert was the loss of liquid metal from the upper seal, thus preventing an airtight closure. As the system cools, the pressure within the insert decreases to siphon the liquid metal from the seal into the sample cup. To overcome this problem, the inventors have found that a minimum clearance is required between the lower margins of the dome 93 and the central raised portion 99. The amount of the minimum clearance depends on the surface tension of the liquid metal within the seal. The greater the surface tension, the more likely the liquid is to remain a coherent mass within the inner annulus and be swept into overflow pipe 99 by gas flow as the pressure within the insert decreases. A sufficient clearance, however, can be provided within the inner annulus to allow the liquid mass to part and gas to bubble through into the insert, thus equalizing the pressure across the seal. With sodium and other metals of similar surface tension at the operating temperature of the archive-cup insert, it is of importance that a minimum radial clearance of at least one-fourth inch be employed between the outside surface of the raised portion 99 and the inside surface of dome 93 at the lower margins which extend into the seal reservoir.

In order to maintain a sufficient amount of liquid metal within the reservoir to freeze into a tight seal, the volume of the inner annulus should be a substantial fraction of the total volume within the reservoir. As a reduced pressure from cooling is produced within the insert, the liquid metal is drawn from the outer annulus into the inner annulus and the central overflow outlet. After the pressure has equalized across the seal, the liquid within the inner annulus will again occupy the full reservoir and must be of sufficient volume to adequately occlude the passageways beneath the seal dome. Therefore it is of importance that the volume of the inner annulus be in excess of the volume in the outer annulus of the upper seal.

It is also of importance that a sufficient depth be provided for liquid metal between the top of overflow pipe 99 and the bottom of dome 93 to allow a sufficiently thick seal to be formed. In addition allowances can be made for surface irregularities and slight deviations from vertical alignment in this manner. It is estimated that a minimum depth of about three-eighths inch should be employed in the annular seals used in the archive-cup insert.

One example of an archive-cup insert that has been built and successfully tested includes a 1⅝ inch O.D., 0.032 inch wall, outer tube of about 8 inches in length including the lower seal. The upper seal is tightly fitted into the outer tube about 3½ inches down from the top. This seal includes a rounded dome of 1⅛ inch diameter and seven-eighths inch height axially positioned within an annular reservoir of 1¼ inch outside diameter and one-half inch inside diameter to give a seal depth of three-eighths inch between the lower edge of the dome and the overflow at the top of raised portion 99. A central opening of one-fourth inch through the raised portion is directed toward a sample cup of 1⅛ inch O.D. and about 2 cubic inches volume which is spaced from the outer tube walls by an annulus of 0.15 inch width for overflow into the lower seal. The lower seal has a 1⅛ inch diameter pedestal for supporting the cup surrounded by a reservoir of about one-half inch depth for the liquid-metal seal.

In using an archive-cup insert of this particular design, a flow of 0.15 to 0.25 gpm of sodium metal at 400° to 1,200° F. flows through the upper seal, the sample cup and overflows from the lower seal. It has been found that typical foreign materials within the sodium coolant of a nuclear reactor, e.g. $Al_2O_3$ particles of 5 μm or smaller, can be flushed from the sample cup in about 30 minutes of this type operation. Immiscible foreign materials in liquid form and having relatively low density are promptly flushed from the cup. One important aspect in providing this flushing capability is in the sizing of central opening 102 through the upper seal. At the above flow rates, an opening of one-fourth inch diameter gave the best results with larger openings producing a poorer flushing of particulates and smaller openings causing the upper portion of the insert to flood.

Liquid-metal samples collected in the above manner are found to be hermetically sealed within the insert after the liquid metal freezes within the upper and lower seals. Such samples can be stored for extended periods of time without intrusion of oxygen or other atmospheric impurities that would affect the accuracy of a subsequent analysis. Furthermore, other foreign materials are either removed or settle to the bottom of the sample cup to permit accurate analyses.

It can be seen from the foregoing that the present invention provides a novel insert for a sampling system that can collect hermetically sealed samples of a liquid-metal coolant for archive storage and later analysis. The insert can be interchangeable with other inserts for various other sampling and analytical functions within a multipurpose sampler device. Although the archive-cup insert is described in detail herein, it will be clear that various modifications, including, for instance, a filter medium for removing particulate material from the inlet liquid-metal flow, can be employed in combination with this insert within the scope of the claims.

The embodiments of the invention in which an exclusive property or privilege is claimed are defined as follows:

1. An insert for collecting a sealed sample of liquid metal from within a vertical casing comprising:
   a. an elongated tube having detachable support means for retrieving said tube from within said vertical casing;
   b. a sample cup for containing sample liquid axially within the lower portion of said tube and spaced from the internal walls thereof to define a passageway for sample liquid overflow;
   c. first, overflow seal means for hermetically occluding said tube above said sample cup, said first means having a reservoir for trapping solidifiable sample liquid and an overflow discharge directed into said sample cup; and
   d. second, overflow seal means for hermetically occluding said tube below said sample cup, said second means having a reservoir for trapping solidifiable sample liquid received from said sample cup and having an overflow for discharging said sample liquid.

2. The insert of claim 1 wherein said first overflow seal means includes a central raised portion having an overflow outlet directed towards said sample cup, and a dome having circumferential margins which extend into said reservoir to form inner and outer annuli, with interconnecting passageways beneath said margins.

3. The insert of claim 2 wherein said circumferential margins of said rounded dome are spaced from said central raised portion by a radial clearance of at least one-fourth inch.

4. The insert of claim 1 wherein said second overflow seal means comprises a centrally located pedestal within said reservoir for supporting said sample cup, the lower margins of said elongated tube extending into said reservoir to form inner and outer annuli with interconnecting passageways beneath said margins.

5. The insert of claim 4 wherein said inner annulus is of greater volume than said outer annulus.

6. The insert of claim 4 wherein said second overflow seal is detachably connected to said elongated tube with a pin and L-slot bayonet connection.

* * * * *